July 23, 1968   A. MONTANI   3,394,003
PLURAL REFLECTION DODGING PROCESS
Filed Oct. 1, 1963
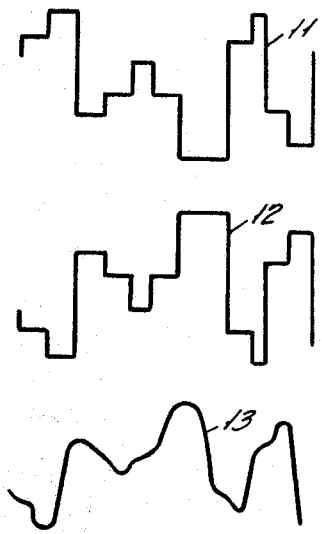
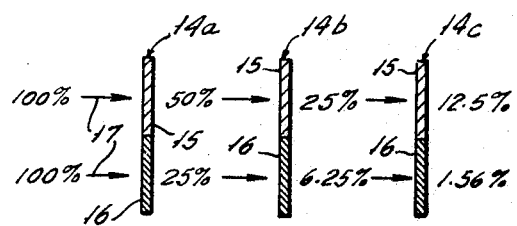
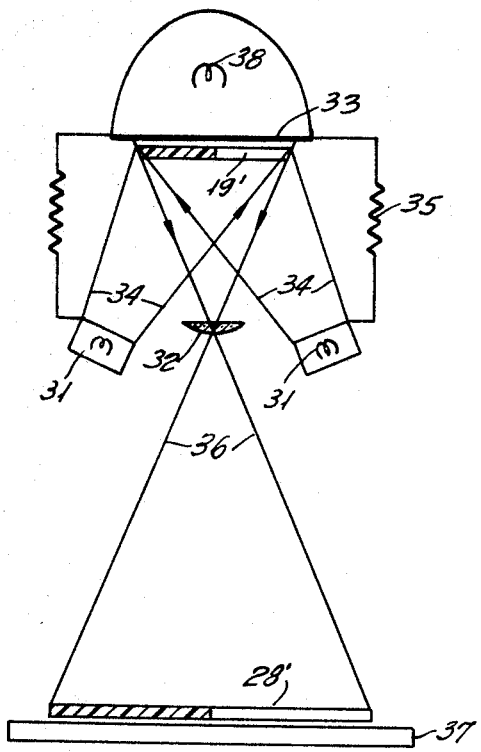
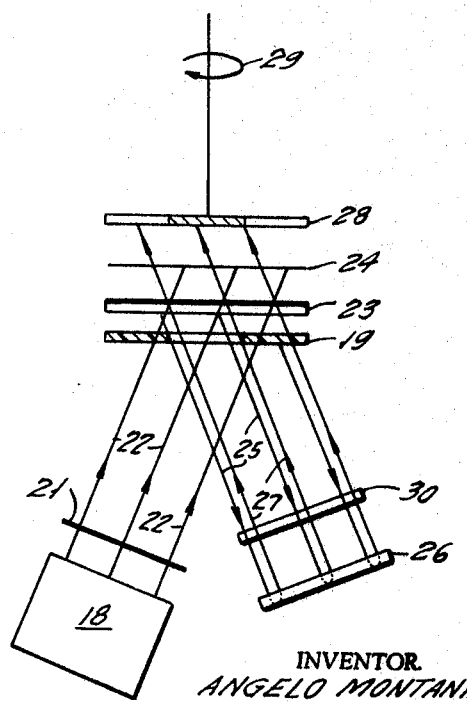
INVENTOR.
ANGELO MONTANI
BY
Raymond R. Skolnick United States Patent Office 3,394,003
Patented July 23, 1968

3,394,003
PLURAL REFLECTION DODGING PROCESS
Angelo Montani, Great Neck, N.Y., assignor to Sperry Rand Corporation, Ford Instrument Company Division, Long Island City, N.Y., a corporation of Delaware
Filed Oct. 1, 1963, Ser. No. 312,986
4 Claims. (Cl. 96—27)

ABSTRACT OF THE DISCLOSURE

The differential contrast of photographic images is decreased by repeatedly traversing a light beam through a photographic image to form upon a photo-sensitive layer a dodged, corrected, reversal image of the photographic image, having decreased variations in contrast as compared with the original image. This effect is obtained by the plural exposure of a photochromic layer to form a corrected masking image, and the use of such mask in the formation of a corrected reversal image.

---

This invention relates to a method and apparatus for preparing masks of photographic images and for effecting contrast correction or dodging operations therewith. More particularly, the invention relates to a method and apparatus for converting a first photographic image having low, medium and high density areas into a second image useful for photographic masking thereof, and to the use of such masking image for the production of a corrected reversal image having decreased variations in contrast, as compared with the original photographic image corrected.

In the following specification, the invention will be described, for purposes of illustration, in terms of the dodging of a photographic negative image by the formation of a positive masking image therefrom and the subsequent use of such mask to produce a corrected positive having reduced density variations as compared with the original negative; it will however be understood that the invention is also applicable to the correction of photographic positives by the formation of, and masking with negatives produced therefrom.

Various dodging procedures have been employed for correcting contrasty photographic negatives to facilitate improved interpretation of details which are not readily observed in such negatives due to their marked contrast variations. Included among such procedures are those making use of the properties of photochromic layers which when exposed to light of particular wave lengths through transparent or translucent negatives, form positive masking images therein. When an image so formed is employed as a mask, during the reversal of the initial negative, a decrease in the contrast variations of the reversed positive is obtained. Dodging procedures employing photochromic materials are disclosed, for example, in U.S. Patent No. 3,085,469 granted Apr. 16, 1963, and in my copending application Ser. No. 252,075 filed on Jan. 17, 1963, now Patent No. 3,160,504 granted on Dec. 8, 1964.

It is among the objects of the present invention to provide an improved method for producing a masking image in a photochromic layer and for utilizing such mask to provide superior photographic dodging.

A further object of the invention is to provide such a method for producing a masking image having improved variations in contrast between the respective areas thereof, thereby facilitating superior dodging control of printing or enlarging operations.

An additional object of the invention is to provide apparatus for forming the improved photochromic masking image in accordance with the invention, in a facile and simple manner.

It is also an object of the invention to provide such an apparatus which may be readily adapted to sequentially form photochromic masking images and thereafter dodge the photographic image to be corrected, utilizing the previously formed mask.

The nature and objects of the invention will be more fully apparent from a consideration of the following detailed description, taken in connection with the accompanying drawing in which:

FIGURE 1 is a composite graph illustrating the profile of the density values of a photographic negative and the theoretical and actual density value profiles of a photochromic masking image thereof;

FIGURE 2 is a schematic illustration of the increased contrast between corresponding areas of a composite photographic image provided by a series of exposures made, in sequence, through three identical photographic negatives, as compared with the contrast between the corresponding areas of one such negative;

FIGURE 3 is an optical diagram of one apparatus for forming improved masking images in accordance with the invention; and FIGURE 4 is an optical diagram of a further apparatus embodying the invention, with which both improved masking images and corrected, reversed images may be produced.

It has been found, in accordance with the invention, that an improved mask useful for the dodging of a photographic image may be produced by exposing a photochromic layer to light passed a plurality of times through the corresponding areas of such image to thereby form the mask, which may thereafter be exposed in superposed relation with the initial image to form a latent reversal image in a photosensitive layer, the latter producing, when processed, a corrected reversal image.

The masking image thus produced possesses optical densities which are generally inversely proportional to the optical densities of the corresponding areas of the initial photographic image. Moreover the density variations of the masking image are more directly dependent upon those of the original image to be corrected than are the density variations of a masking image produced by a single exposure of the photochromic layer through the original image.

As will be described more fully hereinafter, such result is obtained by virtue of the exposure of the photochromic layer through a composite image having a differential contrast ratio R between the respective areas thereof, produced by passing light $n$ times through the corresponding areas of the initial image, which is equal to $(R)^n$. It has been found that, by forming the masking image in response to the greater density variations of such a composite image, the photochromic densities more closely approximate the reversal of the initial image densities than has been possible utilizing known processes.

Turning to the drawing, and as illustrated in FIGURE 1 thereof, the trace 11 represents a profile of the density values of a photographic negative taken along a particular direction on its surface. If, by exposing a photochromic layer to light passing through such a negative, a perfect reversal image could be produced, the trace 12 would represent the density values of the resulting positive produced in the photochromic layer. The trace 12 is a mirror image of the trace 11 and, if utilized as a mask through which the negative represented by trace 11 were to be reversed, would prevent the formation of any composite image, the composite negative and positive images represented by traces 11 and 12 displaying a uniform non-imagewise density. In order to utilize the positive having the hypothetical density trace 12 to mask the negative displaying trace 11, it would of course be necessary to make the positive of a lesser overall density than the uncorrected negative, in order that the composite masked image may retain the characteristics of a negative.

In actual practice the image produced in a photochromic layer by exposure to a negative displaying the density trace 11 may be expected to exhibit the density curve 13 which follows up the reversal trace 12 of the negative densities but differs therefrom because of the material limitations of the photochromic substance, thus imposing a damping effect upon the system and impairing the fidelity of the positive mask. It is accordingly desirable, and among the objects of this invention, to so treat the photochromic layer as to simulate an improvement in its reproduction characteristics in order to more closely approximate preparation of the ideal positive mask displaying the trace 12.

The rate of change with respect to exposure E, of the density values $D_p$ of the masking image produced in the photochromic layer by exposure through the corresponding density values $D_n$ of an initial negative image, may be expressed as follows:

$$\frac{dD_p}{dE} = k(D_n - D_p) \quad (1)$$

or $$D_p = D_n - \frac{1}{k}\left(\frac{dD_p}{dE}\right) \quad (2)$$

In other words, the change of the density $D_p$ of the photochromic image as a function of its exposure is proportional to the difference between the density $D_n$ of the negative image and the photochromic density $D_p$ itself. Moreover, it will be observed that the density of the photochromic image approaches the density of the negative image, the ideal condition at which the trace 12 is obtained, when the proportionality factor $k$ increases. As will be seen from Equation 2 above, such an increase in the value of the proportionality factor $k$ may be simulated by increasing the negative densities $D_n$ to which the photochromic layer is exposed.

In accordance with the invention the "apparent" negative densities $D_n$ to which the photochromic layer is exposed are increased by exposing the photochromic layer to light passed a plurality of times through the initial negative image, thereby simulating the exposure of such layer through a corresponding plurality of identical superposed, registered negatives. The photochromic layer is thus, in effect, exposed to a composite negative having markedly greater differential negative densities and contrast ratios than the initial negative to be corrected.

The effect of exposing a photochromic layer through a plurality of superposed images of a negative to be corrected is more clearly shown in FIGURE 2 of the drawing, in which identical negatives 14a, 14b and 14c are illustrated. Each of such negatives includes a first area 15 which transmits one-half the light projected thereto and a second, denser area 16 which transmits only one-fourth of the light projected thereto. Upon passing light beams 17 through the respective areas of each of the negatives 14a, 14b and 14c, in sequence, it will be noted that 12.5% of the initial light projected upon the areas 15 is transmitted through the final negative 14c, whereas only 1.5% of the light projected upon the areas 16 of the respective negatives is transmitted through the final negative 14c. Hence, while the contrast ratio between areas 16 and 15 of negative 14a is 2:1, the corresponding contrast ratio of the composite negative defined by the registered negatives 14a, 14b and 14c is 8:1. Thus, by passing the light through a plurality of registered identical negatives the apparent contrast ratio between the corresponding areas of the negatives is markedly increased.

Mathematically, the contrast ratio $R_1$ between the areas 16 and 15 of the negative 14a is 2:1; the ratio $R_2$ between the corresponding areas fo the composite negatives 14a and 14b is $$\left(\frac{2}{1}\right)^2$$

the ratio $R_3$ between the corresponding areas of the composite negatives 14a, 14b and 14c is $$\left(\frac{2}{1}\right)^3$$

and the contrast ratio R between the corresponding areas of $n$ composite negatives is $(R)^n$.

Hence the contrast ratio and the apparent density differences between the areas of a negative to be dodged may be markedly increased, by passing the light through the negative several times. As indicated above, when a photochromic layer is exposed to such apparently increased negative densities, it has been found that the fidelity of an image produced in the photochromic layer is markedly improved, in accordance with the invention.

FIGURE 3 illustrates an apparatus embodying the invention which may be employed to form a masking image in a photochromic layer by reflecting the radiation utilized to form the mask three times through the initial negative to be masked.

The device shown includes a light source disposed in optical alignment with the transparent or translucent negative 19 to be illuminated thereby. Since most known photochromic materials are suitably darkened by ultraviolet radiation, the element 18 is suitably a UV source. A polarizing element 21 is optically aligned with the light source 18, desirably interposed between the negative 19 and such source. The light beams 22 projected by the light source are thus linearly polarized by element 21 and receive a first image, imparted by the negative 19.

A semitransparent mirror 23 is optically aligned with the light source 18 and the polarizing element 21. The image bearing light beams 22, upon impinging on the mirror 23, are partially transmitted therethrough, striking a second polarizing element 24 which is rotated 90° with respect to the first polarizing element 21 in order to prevent the transmission of the linearly polarized beams therethrough. The remaining portion of the light is reflected by mirror 23, the reflected beams 25 passing through negative 19 to impart two superposed, registered images to the image carrying beam.

A full mirror 26 is disposed in optical alignment with the semitransparent mirror 23 and the negative 19, for again reflecting the image carrying light beams through the negative. The doubly reflected beams 27, after passing through negative 19, bear three superposed, registered images. Interposed between the negative 19 and the mirror 26, in optical alignment therewith, is a one-eighth wave length retardation plate 30; upon passing through such plate twice (before and after reflection from mirror 26) the previously linearly polarized light beams are circularly polarized at 27. After impingement on the semitransparent mirror 23 the portion of the light beams 27 transmitted therethrough, being circularly polarized, pass through the second polarizing element 24 without interference.

A photochromic layer 28 is disposed in optical alignment with the mirror 26 and the negative 19, the doubly reflected light beams 27 impinging thereon bearing the composite of three superposed, registered images of said negative and thereby forming a positive masking image having markedly improved fidelity as compared with that of such an image produced by a simple exposure through the negative to be corrected.

For clarity, the negative 19, the semitransparent mirror 23, the second polarizing element 24 and the photochromic layer 28 have been shown in spaced apart relation; however, in practice it is preferred to provide elements 23, 24 and 28 in a single mechanical unit comprised, for example, of a laminate of the individual elements, and to place the negative 19 in closely spaced relation adjacent such laminate. By thus leaving a relatively minute spacing between the photochromic layer 28 and the negative 19 registration of the projected images is assured, yet the masking image produced is slightly blurred to effect dodging of the large areas of the negative without dodging the small details thereof, as described more fully in the aforesaid copending application.

It is additionally desirable to provide for rotating the asssembly of elements 23, 24 and 28 of FIGURE 3 about their central axis as indicated at 29, in order to produce an even and symmetrical unsharp mask.

The positive masking image thus produced employing the apparatus of FIGURE 3 may be utilized to mask the original negative to produce a corrected positive, employing any suitable projection or contact printing apparatus.

One particularly desirable projection printer, which may be employed both for forming the photochromic mask and the corrected positive utilizing such mask, is illustrated in FIGURE 4. The printer includes a light source 31 which, like light source 18, is desirably rich in ultraviolet radiation. The source 31 may possess a continuous annular or ring shaped configuration and may, for example, be a circline bulb or a number of individual ultraviolet lamps, arranged in a ring-like configuration around a removable projection lens 32. A planar reflecting mirror 33 is disposed in optical alignment with the light source 31 and with a suitable transparency mount, in order that light beams 34 projected from the source may pass through the photographic negative 19' to be corrected, impinge on the mirror 33 and be reflected back through the negative 19'.

The light source 31, projection lens 32 and reflecting mirror 33 are disposed in a suitable housing, e.g., an enlarger housing having a bellows structure 35, so arranged that the image bearing beams 36 reflected from the mirror 33 are projected through lens 32 and focused thereby on a photochromic layer 28' mounted on a suitable support, such as an enlarger's easel 37. By exposing the photochromic layer 28' in this manner, two superposed images of the negative 19' are formed in registered relation thereon, producing a positive masking image having improved density variations therein.

The mirror 33 is removable to expose a conventional visible light source 38 which is disposed in optical alignment with the negative 19', the projection lens 32, the imaged photochromic layer 28' and the supporting easel 37. By deactivating the ultraviolet light source 31, removing the mirror 33, placing a photosensitive layer between the easel and the photochromic layer 28', and activating the visible light source 38, the photosensitive layer is exposed through the positive mask in layer 28' and the uncorrected negative 19', to produce the desired dodged, corrected positive.

It has been found in practice that conventional anastigmatic enlarging lenses absorb a considerable portion of the ultraviolet radiation which is desirably utilized to produce the positive mask in the photochromic layer. Accordingly, it it preferable to employ a removable quartz lens 32 during the formation of the masking image, and to thereafter replace such lens with a conventional anastigmatic lens of the same equivalent focal length prior to performing the dodging operation with the preformed mask. Such lenses may of course be mounted on a rotatable turret or other lens mount in the manner well-known in the art.

Any photochromic material which exhibits reversible darkening upon exposure to radiation of particular wave lengths may be utilized in the practice of the present invention. It is, however, preferred to use those photochromic compounds, e.g., various of the spiropyrans, which acquire coloration when exposed to ultraviolet light having a wave length between 3000 A. and 4000 A. Nevertheless, it will be understood that any of those photochromic materials disclosed, for example, in the aforesaid Patent No. 3,085,469 or in my copending application Ser. No. 252,075 may be utilized in accordance with this invention.

Since these and other changes may be made in the embodiments described above without departing from the scope of the invention, it is intended that all matter contained in the preceding description shall be interpreted as illustrative and not in a limiting sense.

I claim.

1. A method of dodging a photographic image having low, medium and high density areas, which comprises
 (a) generating a linearly polarized light beam;
 (b) passing said light beam through said photographic image to impart a first reversed image of said photographic image to said beam;
 (c) impinging the resulting image-bearing beam upon a semitransparent reflective surface,
  (1) a portion of the beam being transmitted through said surface and striking a polarizing element so oriented as to bar transmission therethrough of said linearly polarized light and
  (2) the remaining portion of the beam being reflected from said surface and passing through said photographic image to impart a second reversed image thereof to said beam;
 (d) impinging the resulting reflected image-bearing beam upon a reflecting surface and circularly polarizing the same;
 (e) passing the doubly reflected image-bearing beam through said photographic image to impart a third reverse image thereof to said beam, said first, second and third images being formed in superposed, registered relation;
 (f) impinging said doubly reflected circularly polarized beam upon said semitransparent reflective surface, a portion of said beam being transmitted through said surface and through said polarizing element, and impinging upon a photochromic layer to thereby form said masking image; and
 (g) passing a light beam through said photographic image and the thus formed masking image upon a photosensitive layer to produce a dodged, corrected reversal image of said photographic image, having decreased variations in the differential optical densities thereof.

2. A method of dodging a photographic image having low, medium and high density areas, which comprises
 (a) passing a beam of ultraviolet light through said photographic image to impart a first reversed image of said photographic image to said beam;
 (c) impinging the resulting image-bearing beam upon a reflecting mirror and reflecting the same through said photographic image to impart a second reversed image thereof to said beam, said first and second images being formed in superposed, registered relation;
 (c) projecting the reflected imaged beam through a quartz lens upon a photochromic layer to form an unsharp reversal mask of said photographic image thereon; and
 (d) passing a beam of visible light through said photographic image, through an anastigmatic enlarging lens, and through said mask, upon a photosensitive layer to produce a dodged, corrected reversal image of said photographic image, having decreased variations in the differential optical densities thereof.

3. A method of dodging a photographic image having low, medium and high density areas, which comprises
 (a) passing a light beam through said photographic image to impart a first image thereof to said beam;
 (b) impinging the image-bearing beam upon a reflecting surface and reflecting the same through said photographic image to impart a second image thereof to said beam, said first and second images being formed in superposed, registered relation;

(c) impinging the image-bearing beam upon a photochromic layer to thereby form said masking image; and (d) passing a light beam through said photographic image and the thus formed masking image upon a photosensitive layer to produce a dodged, corrected reversal image of said photographic image, having decreased variations in the differential optical densities thereof.

4. The method as defined in claim 3, in which the image-bearing beam produced in step (b) is impinged upon a reflecting surface and again reflected through said photographic image to impart a third image thereof to said beam, prior to being impinged upon said photochromic layer in step (c).

References Cited
UNITED STATES PATENTS

| | | | |
|---|---|---|---|
| 2,641,963 | 6/1953 | Carter | 88—24 |
| 2,783,678 | 3/1957 | Anredas et al. | 88—24 |
| 3,085,469 | 4/1963 | Carlson | 88—24 |
| 3,160,504 | 12/1964 | Montani | 96—27 |

OTHER REFERENCES

Photographic Science & Engineering, vol. 5, No. 3 (1961) pp. 175–180, (TRIP674), (Cloupeau).

Photographic Science & Engineering, vol. 7, No. 4 (1963) pp. 241–245 (TRIP674)( Kohler et al.).

NORMAN G. TORCHIN, *Primary Examiner.*

R. E. FICHTER, *Assistant Examiner.*